No. 765,859. PATENTED JULY 26, 1904.
J. E. SCHNEIDER.
ATTACHMENT FOR KETTLES.
APPLICATION FILED APR. 5, 1904.
NO MODEL.

Witnesses
F. A. Parron
M. A. Schmidt

Inventor
John E. Schneider
by Milo B. Stevens & Co.
Attorneys

No. 765,859. Patented July 26, 1904.

UNITED STATES PATENT OFFICE.

JOHN E. SCHNEIDER, OF CLEVELAND, OHIO.

ATTACHMENT FOR KETTLES.

SPECIFICATION forming part of Letters Patent No. 765,859, dated July 26, 1904.

Application filed April 5, 1904. Serial No. 201,706. (No model.)

*To all whom it may concern:*

Be it known that I, JOHN E. SCHNEIDER, a citizen of the United States, residing at Cleveland, in the county of Cuyahoga and State of Ohio, have invented new and useful Improvements in Attachments for Kettles, of which the following is a specification.

My invention relates to an attachment for kettles for steaming puddings and other articles of food; and it consists in certain novel features of construction hereinafter described and claimed, and shown in the accompanying drawings, in which—

Figure 1:
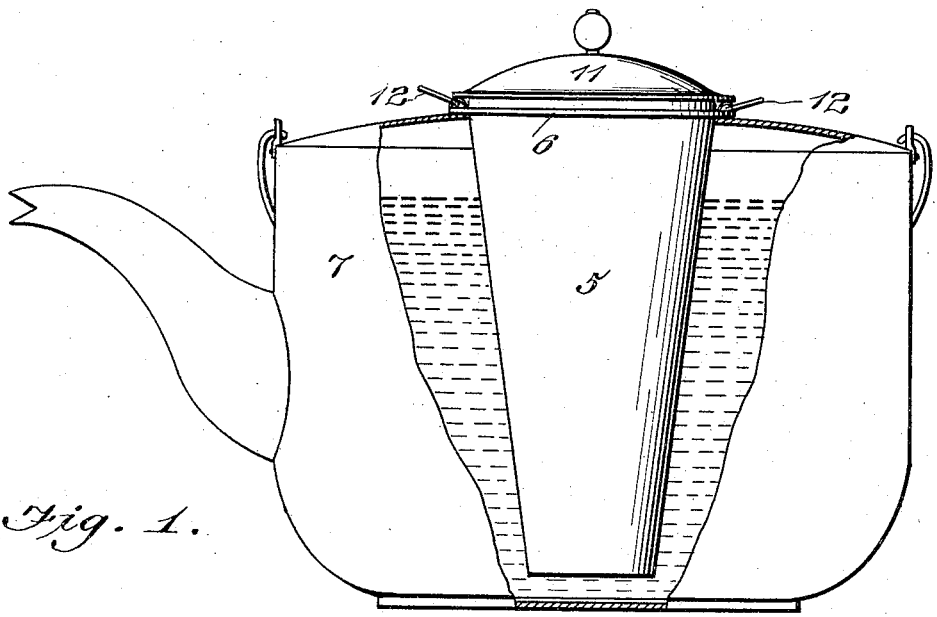
Figure 2:
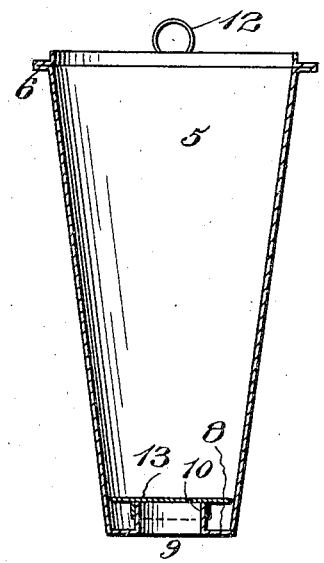

Figure 1 is an elevation of the device, showing its position in a kettle. Fig. 2 is a vertical section thereof.

Referring specifically to the drawings, 5 denotes a hollow conical vessel open at the top and having near its upper edge a horizontal flange 6, whereby it is supported in the kettle 7, said flange extending around the kettle-opening. The vessel extends into the kettle and has at its bottom 8 an opening 9, from which a short tube 10 extends upwardly into the vessel. A cap 13 is placed over the top of the tube 10 and extends to the sides of the vessel, forming a false bottom.

In use the vessel is placed in the kettle and extends down to a short distance above the bottom thereof, being supported in the opening by the flange 6. The article to be cooked is put in the vessel, which is closed by the kettle-lid 11, as shown. Rings 12, secured to the flange 6, afford convenient means for grasping the vessel to remove it from the kettle.

Besides cooking purposes the vessel can also be conveniently used for warming foods, and by placing it in the kettle without the cap 13 it will prevent burning of the hand when the lid of the kettle is removed, the escape of the steam being checked sufficiently by the device.

Having thus described my invention, what is claimed as new, and desired to be secured by Letters Patent, is—

The combination with a kettle, of a conical vessel suspended therein from the kettle-opening, said vessel having an open top, and an opening in the bottom, a tube extending from the latter opening into the vessel, and a removable cap over the top of the tube extending to the sides of the vessel and forming a false bottom.

In testimony whereof I have signed my name to this specification in the presence of two subscribing witnesses.

JOHN E. SCHNEIDER.

Witnesses:
LOTTIE NEWBURN,
JOHN A. BOMMHARDT.